United States Patent [19]

Jahnke

[11] Patent Number: 4,683,106
[45] Date of Patent: Jul. 28, 1987

[54] WIRING INSTALLATION ABOVE THE COVER OF A NUCLEAR REACTOR VESSEL FOR CONNECTION OF ELECTRIC DEVICES

[75] Inventor: Serge Jahnke, Paris, France

[73] Assignee: Framatome & Cie., Courbevoie, France

[21] Appl. No.: 752,426

[22] Filed: Jul. 8, 1985

[30] Foreign Application Priority Data

Jul. 6, 1984 [FR] France ............................... 84 10758

[51] Int. Cl.$^4$ ............................................. G21C 17/00
[52] U.S. Cl. .................................... 376/259; 376/249; 376/258; 376/463
[58] Field of Search ............... 376/463, 261, 260, 259, 376/262, 245, 249, 258

[56] References Cited

U.S. PATENT DOCUMENTS

| 3,836,429 | 9/1974 | Frisch et al. | 376/262 |
| 3,919,043 | 11/1975 | Reid | 376/258 |
| 4,235,674 | 11/1980 | Yue | 376/258 X |
| 4,495,144 | 1/1985 | Lingren et al. | 376/259 X |

Primary Examiner—John F. Terapane
Assistant Examiner—John S. Maples
Attorney, Agent, or Firm—Pollock, Vande Sande & Priddy

[57] ABSTRACT

Installation for electric connection of devices placed inside the containment of a PWR, comprising a first cable associated with each electric device, extending from the device and connected to a fixed connector installed above the cover of the reactor vessel. A second cable is connected to the connector and to a connector fixed to a plate remote from the reactor vessel. Each second cable is formed from several sections including a first section for connection to the fixed connector above the cover and to a lead-in connector at the end of a leak tight conduit installed horizontally above the cover and a second section inside the conduit. A third section is adapted for connection to a lead-out connector from the conduit and to the connector fixed to the plate at a distance from the reactor.

5 Claims, 4 Drawing Figures

WIRING INSTALLATION ABOVE THE COVER OF A NUCLEAR REACTOR VESSEL FOR CONNECTION OF ELECTRIC DEVICES

FIELD OF THE INVENTION

The invention relates to wiring installations located above the top cover of a nuclear reactor, in particular a pressurized water nuclear reactor, in the reactor containment building.

BACKGROUND OF THE INVENTION

A number of electrical devices are located in a nuclear reactor building and require electric connection wires and cables. Such devices include measuring sensors, particularly sensors for measuring the position of the control clusters in the reactor core and thermo-couples for measuring the temperature of the core, and mechanisms for actuating the neutron absorption clusters for controlling and stopping the core. The cables are numerous and cumbersome, in particular above the cover of the reactor vessel. By way of example, for a nuclear reactor with four loops, the number of control and shutdown clusters may be as high as seventy-three and the number of thermo-couples as high as fifty-two. For each control cluster, cable is required for powering the cluster actuating mechanism and a cable for the sensor measuring the position of the cluster; each thermo-couple is connected to a cable. That makes a total of one hundred and ninety-eight cables.

To date, the cables have been disposed as follows: each cable has a first section connecting the electric device and a fixed connector installed above the cover. A second section extends from the fixed connector to another fixed connector installed on a connector plate remote from the reactor; all second sections of the cables are distributed in two half rings and then extend from the reactor as a single harness supported by a bridge disposed between the reactor and the plate installed at a distance therefrom.

Such a cabling installation has disadvantages. Positioning the cables is a long and delicate operation since a single section extends from a fixed connector situated above the cover to the plate situated at a distance from the reactor, and is consequently very long and difficult to handle. The diameter of the section may be such that it cannot easily be bent, and the small space available above the cover cannot accomodate an excess cable length; the length of each cable is therefore adjusted on the spot during installation thereof, the removable connectors situated at the ends of the cables are consequently mounted on the spot, under difficult conditions.

Once installed, the cable has further drawbacks: for removing the cover from the reactor the cables must be disconnected from the plate remote from the core and the bridge must be raised along with the cables which it supports.

Furthermore, changing a cable during the lifetime of the reactor is a difficult operation since the large number of cables means that the bridge supports several layers of cables: handling of the cables in the lower part of the harness which extends across the bridge is difficult in the hostile environment due to radioactivity from the core.

The difficulties are still greater when the number of sensors measuring the position of the clusters is increased to achieve redundancy (for example to four) for reliability. This means installing four sensors which transmit the same information to four different processing systems. In this case, and to comply with the safety standards, the electric power supplies for these measuring systems must be different in origin and spatially separated. Similarly, the paths for the transmission cables must be different and minimum distances, of about 300 mm if these paths are open, are required between the paths followed by these cables. Referring to the above example, with redundant sensors for measuring the position of the clusters, the number of cables for measuring the positions of the clusters, which was seventy-three, now becomes two hundred and ninety-two. Added to the cable supplying power to the cluster actuating mechanisms and to those carrying temperature signals from thermocouples, a total of four hundred and seventeen cables must be installed above the cover. Taking into account the minimum distances imposed by installation regulations, the volume required for the cables is appreciably greater than the volume of cables used to date since the amount of cables is about three times greater than that used at present.

There is consequently a need for a wiring arrangement making it possible to increase the number of sensors measuring the position of the control clusters so that they may be redundant and free of the above-mentioned disadvantages.

SUMMARY OF THE INVENTION

It is an object of the invention to provide an improved wiring installation for connection of electric devices which are placed above the cover of the reactor and inside a nuclear reactor building, the devices being e.g., sensors for measuring the position of the control clusters and actuators for the mechanisms controlling these clusters of thermo-couples. It is a more specific object to provide an installation suitable for accommodating a very high number of cables, in particular cables associated with redundant electric devices, and which allows cables to be readily fitted and changed during the lifetime of the reactor, and the cover of the reactor to be removed without difficulties.

For that purpose, there is provided an installation for cabling electric devices placed inside a nuclear reactor building, such as sensors for measuring the position of the clusters controlling the core, actuators for the mechanisms controlling these clusters or thermo-couples comprising:

associated with each of the electric devices, at least a first cable extending from the device and whose end opposite the device is connected to a fixed connector installed above the top cover of the reactor, the arrangement of the fixed connectors corresponding to similar electric devices being similar, corresponding to each of the first cables, a second cable having a mobile connector at each of its ends and connectable on the one hand to the fixed connector installed above the top cover and on the other hand to a connector fixed to a plate installed at a distance from the reactor, means for supporting the assembly of the second cables from the fixed connectors installed above the top cover to the connectors fixed to said plate.

According to the invention, each of the second cables is formed from several sections:

a first section having two mobile connectors for connection on the one hand to a fixed connector installed above the top cover and on the other hand to a fixed input connector in a sealed conduit installed horizontally above the top cover.

a second section inside the conduit, connected both to the input connector in the conduit and to a fixed output connector of the conduit, a third section having two mobile connectors for connection both to the fixed output connector of the conduit and to the connector fixed on the plate installed at a distance from the core.

Preferably, the conduits are installed in at least one plane perpendicular to the axis of a reactor, the conduits in each plane being parallel to each other.

The input connectors for each conduit may be disposed on the lateral parts of the conduit and the output connectors at the ends of the conduit.

Preferably, each conduit is divided longitudinally into two independent compartments each comprising a lateral part and an end of the conduit.

Furthermore, associated with each fixed connector installed above the top, is an input connector into a neighboring conduit, so that all the first sections connecting, to their input connector, fixed connectors corresponding to similar electric devices are of the same length.

In the case where several electric devices are redundant, conduit input connectors situated in separate conduits are associated with the fixed connectors situated above the top cover at the ends of the first cables relative to these devices.

Preferably, all third sections of those second cables which extend in the same direction from mutually parallel conduits are supported by the same bridge up to the same plate at a distance from the core.

BRIEF DESCRIPTION OF THE DRAWINGS

The invention will now be described in greater detail with reference to a particular embodiment given by way of example and illustrated in the accompanying drawings, in which.

DETAILED DESCRIPTION OF A PREFERRED EMBODIMENT

Figure 1:
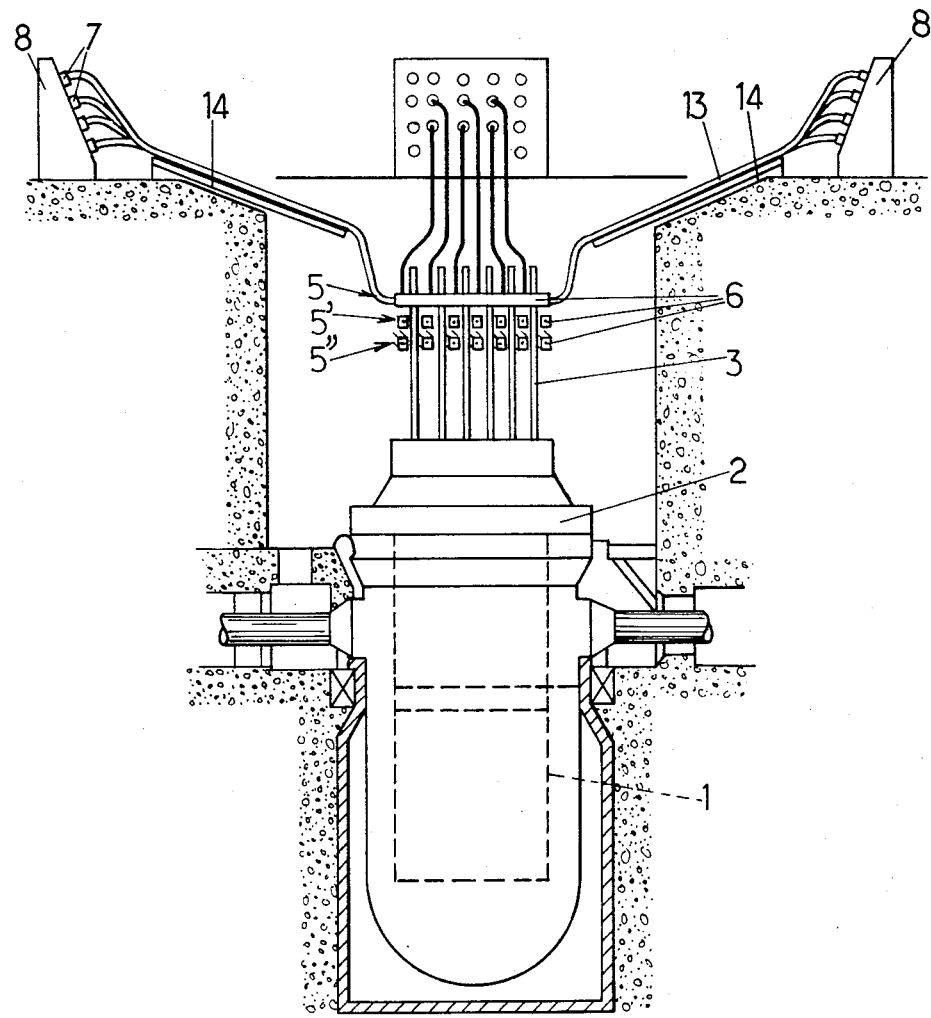
FIG. 1 is a front, partly sectional view of a nuclear reactor having a wiring installation in accordance with an embodiment of the invention.

FIG. 1 shows a nuclear vessel reactor 1 closed at its upper end by a cover 2. Clusters (not shown) which may be conventional in nature and construction are located in the reactor vessel for controlling the core. Sensors are provided for measuring the position of the clusters as well as mechanisms for actuating the clusters and thermocouples for monitoring the temperature in the core. Such elements are quite conventional and have not therefore been shown. What is important here is that these elements are connected to the outside of the reactor by electric cables or wires: the sensors for measuring the position of the clusters and the thermocouples must be provided with means for conveying their output signals to signal processing systems placed outside the reactor vessel. The mechanisms for actuating the clusters require electric power.

Figure 4:
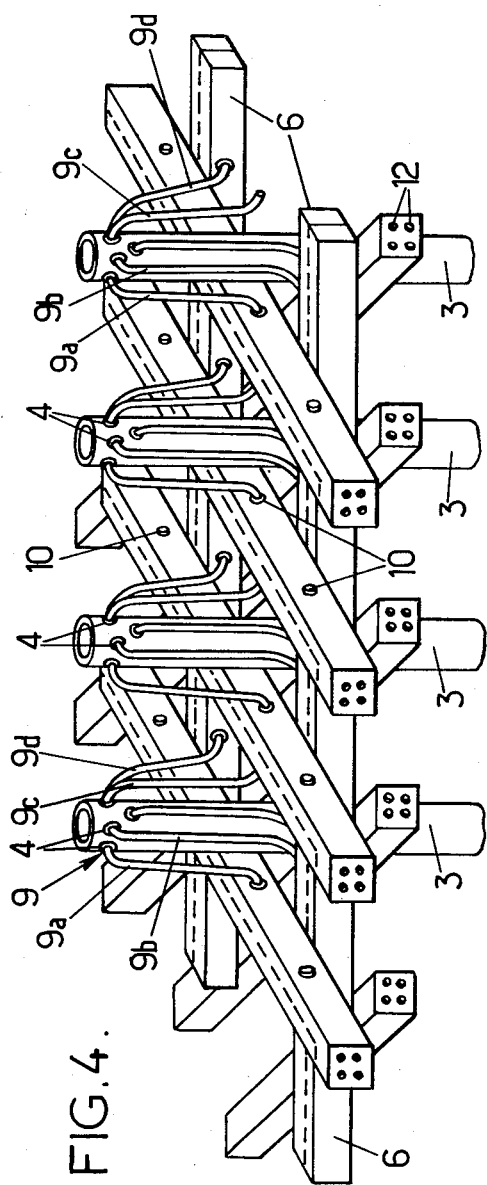
FIG. 4 is a detailed isometric view of some of the fixed connectors situated above the cover and some ducts and sections which connect the fixed connectors to the associated ducts in the wiring installation of FIGS. 1–3.

Each of the electric devices is therefore provided with at least one cable which is guided to the outside of the reactor, through the cover, by a guide 3 and which ends with a fixed connector 4. As shown in FIG. 4, cables connected to the electric devices situated in the reactor vessel are guided inside fluid tight guide tubes 3 up to the fixed connectors 4. Those connectors 4, which correspond to similar electric devices inside the reactors, have a similar arrangement. For example, the fixed connectors 4 to which the control cluster position sensors are connected are all disposed in a same plane, perpendicular to the vertical axis of the reactor vessel, at the upper end of each tube 3 situated vertically above each cluster, and are evenly distributed around the end portion of the tubes 3 at 90° (if the number of measuring sensors is four). Thus, the arrangement with respect to each other of the connectors 4 associated with the sensors measuring the position of the clusters is similar to the arrangement of the sensors inside the reactor vessel.

Similarly, the fixed connectors corresponding to the actuating mechanisms of the control clusters are all situated similarly at the upper part of tubes 3 and the fixed connectors corresponding to the thermocouples are all disposed in a same plane with an arrangement similar to the arrangement inside the core. In FIG. 4 only those fixed connectors have been shown which correspond to the sensors measuring the position of the clusters (four connectors situated at the end of tube 3) and a fixed connector corresponding to a cluster actuating mechanism (situated in a plane slightly below the four preceding connectors).

Figure 2:
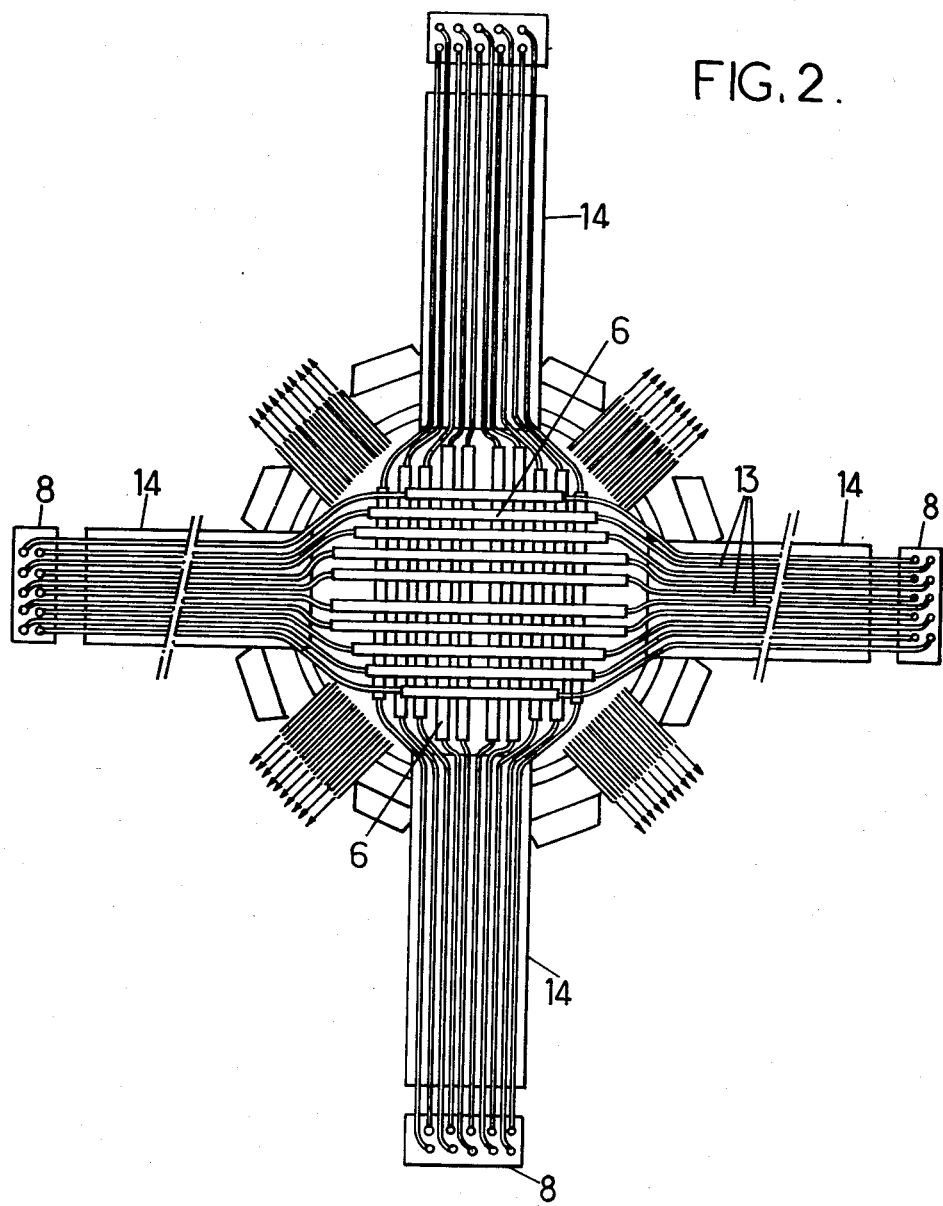
FIG. 2 is a top view of the reactor of FIG. 1.
Figure 3:
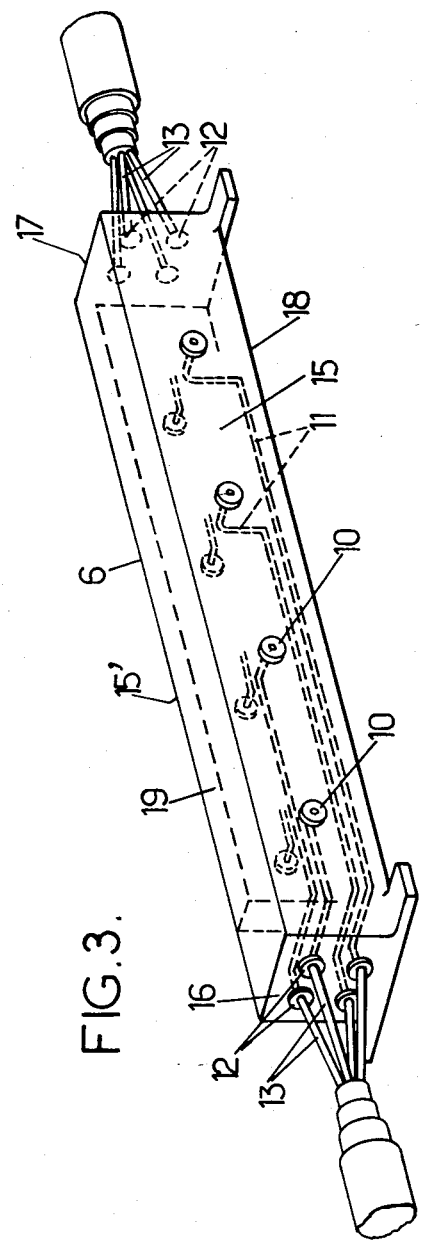
FIG. 3 shows in perspective a conduit used in the wiring installation of FIGS. 1 and 2.

Referring again to FIG. 1, two layers 5 and 5' of conduits 6 are shown. Sections of cables connecting fixed connectors 4 to fixed connectors 7 situated on plates 8 placed at a distance from the reactor extend along the conduits 6. As seen in FIG. 4, the cables comprise a first section which connects a fixed connector 4 to a fixed connector 10, also fixed, constituting an inlet into one of ducts 6. The first sections are identified as a whole as 9. Referring to FIG. 3, a second section 11 of the cable connects each of the inlet connectors 10 to a lead-out connector 12 constituting an outlet from conduit 6. Referring to FIGS. 1 and 2, third sections 13 connect the lead out connectors 12 from conduits 6 to connectors 7 carried on plates 8 located at a distance from the reactor vessel. The third sections are supported by bridges 14 (FIGS. 1 and 2).

Referring to FIG. 2, the conduits are arranged in planar layers pependicular to the axis of the reactor vessel; in each layer, the conduits are mutually parallel. Thus layers 5 and 5' have conduits 6 orientated in directions at 90° from each other. Layer 5" has conduits orientated at 45° from those in layers 5 and 5'.

Referring to FIG. 3, a conduit 6 is parallelepipedic in shape. The associated lead-in connectors 10 are situated on the larger surfaces 15 and 15' whereas the lead-out connectors 12 are situated on end faces 16 and 17. Conduit 6 is divided longitudinally into two separate compartments 18 and 19 each comprising a larger lateral surface 15 or 15' and an end surface 16 or 17 of the conduit 6. Thus, the sections 11 in one of compartments 18 or 19 are not in contact with the sections 11 in the other compartment. The number of lead-in connectors 10 on each lateral surface 15 or 15' may typically be equal to the number of lead-out connectors 12 corresponding to each lead-in connector 10 and conversely.

It is however, possible for the connectors 12 to be less in number than the connectors 10, several sections 11 being connected to a same lead-out connector 12. FIG. 3, shows a conduit 6 which has four lead-in connectors 10 on each lateral surface 15 or 15' and four lead-out connectors 12 on each end surface 16 or 17. However, the number may be higher, in particular on conduits 6 situated close to the axis where the conduits 6 have a length close to the diameter of the reactor core.

Referring to FIG. 4, each fixed connector 4 above the cover is associated with a connector 10 leading into a conduit 6 and close to connector 4; thus, the first sections 9 connecting fixed connectors 4 to the associated lead-in connectors 10 and corresponding to similar electric devices have the same length. In FIG. 4, all first sections identified as 9a are of the same length, and sections 9b, 9c or 9d also have the same length as all those similar thereto. In addition, in the particular case of FIG. 4, sections 9a and 9c are equal to each other; the same goes for sections 9b and 9d. The identity of the lengths of the respective sections comprising sections 9 makes these sections interchangeable; when a malfunction occurs in one of sections 9, it may be very quickly changed since sections 9 are all prepared beforehand to a suitable length, so that all that is required is to connect each of the mobile connectors situated at the ends of the section on the one hand to the fixed connector 4 and on the other to the fixed connector 10.

The arrangement of the first sections 9 is, moreover, such that, in the case where several electric devices are redundant, which is the case for the sensors measuring the position of the clusters, conduit lead-in connectors 10 situated in separate conduits 6 are associated with the fixed connectors 4 situated above the top cover at the ends of the first cables relative to these devices. Thus, the second sections 11 of the cables relative to these redundant electric devices are necessarily in separate conduits 6; should a malfunction occur in one or even more of these conduits 6, at least one of the conduits containing one of the sections relative to these redundant devices will not be damaged and will fulfill its function.

The assembly of the third sections 13 extending from ducts 6 in the same plane, and hence parallel to each other, extends from reactor 1 parallel to the direction of the conduits 6, in two opposite directions, since the sections 13 extend from each conduit 6 through two opposite end faces 16 or 17. The third sections 13 from the same end 16 or 17 of the same conduit 6 are grouped together at the outlet of conduit 6 into a single cable. This single cable is formed in a way conventional in the nuclear field, i.e., it generally comprises a first sheath which is an electric insulator (this sheath may, for example, be formed from chlorosulfonated polyethylene), a second sheath forming a heat screen, made, for example, from glass wool, a third sheath having a metal screen function, formed, for example, from a steel or copper strip or braid, and a fourth insulating sheath made, for example, from chlorosulfonated polyethylene. These sheaths allow the cable to suitably resist heat, radiation, sprinkling with boron-containing water and earthquakes.

Finally, the assembly of cables extending in the same direction from conduits 6 parallel to each other is of a fairly limited number, since this number is equal to the number of conduits situated in the same plane. The assembly of these cables may therefore rest on the bridge 14 which supports it as far as plate 8 situated away from the reactor while only forming a single layer of cables. The number of bridges 14 is of course equal to twice the number of layers of conduit 6 (there are, for example three layers 5, 5' and 5" in the drawings). The direction of the conduit 6 of each layer 5, 5' or 5" is of course provided so that the bridges 14 may be evenly distributed around the reactor.

The cabling installation of the invention has numerous advantages: positioning of the cables is easy since the second cables connecting the fixed connectors 14 situated above the top cover to the fixed connectors 7 situated on plates 8 at a distance from the reactor are formed from several independent sections, of well defined lengths, which may be prepared beforehand and thus need only be connected very simply, using connectors situated at each of their ends. Similarly, dismantling of the cables is very easy. Replacement of the cables is also facilitated, since it is sufficient to change the damaged section of each of the cables which no longer fulfill their function; these sections are readily accessible, in particular the cables grouping together the third sections are disposed in a single layer on the bridges 14; in addition, the replacement sections are prepared beforehand. The facility of fitting, removing and replacing cables allows the operators to minimize their stay in the contaminated environment and to work under easy and more comfortable conditions, without requiring special tools. An additional result is a more reliable assembly.

Furthermore, the installation of the invention allows the use of electric devices, in particular sensors for measuring the position of the clusters, which are redundant. In fact, it is only the very rational arrangement of the cables of the installation of the invention which allows a high number of cables to be used. Furthermore, since the cables extending from redundant devices must be disposed so as to comply with prevailing safety standards since the electric power supplies for these redundant devices must have different origins and be mechanically separate, since the paths of the transmission, cables must be different and since minimum distances are imposed between the paths of the cables, only a very precise organization of the arrangement of these cables makes it possible to use these redundant devices.

The installation of the invention further allows cables corresponding to devices having similar functions, without however being redundant, to be placed in the same compartment, so that all the third sections extending in the same direction from conduits parallel to each other correspond to electric devices having the same function. Thus analog signal processing devices may be grouped together on the same plate 8 at a distance from the reactor. In the conduits, the sections may exist together at small distances, thus allowing a high concentration of the cables.

A cabling installation according to the invention is furthermore very resistant to earthquakes, to radiation and to sprinkling with boron-containing water, for the cables used are constructed so as to resist these environmental conditions in the reactor, each of the sections being surrounded, in a manner known per se by protective sheaths similar to the sheaths of the third sections described above. As for circuits 6, these are made of stainless steel and thus withstand very well the environmental conditions inside the reactor.

I claim:

1. A wiring installation located in a nuclear reactor building containing a nuclear reactor vessel having a vertical axis provided with a cover for connection of electric devices of the nuclear reactor, comprising:
  (a) a plurality of layers of fluid tight conduits located substantially above said cover and disposed perpendicularly to the said axis of the reactor vessel, the conduits in each layer being substantially parallel to each other and the conduits in one layer being disposed at an angle to the conduits in another one of said layers,
  (b) a plurality of first cables each extending from one of said devices and terminated with a first fixed connector located above said cover, those of the first fixed connectors which correspond to similar devices having similar positions,
  (c) a plurality of second cables each associated with one of the first cables and each having
    (i) a first section having two connectors at the ends thereof, one for disconnectable connection to one of said first fixed connectors and the other for disconnectable connection to a fixed lead-in connector leading into one of said fluid tight conduits located substantially horizontally above said cover,
    (ii) a second section inside said conduit connected at one of the ends thereof to the lead-in connector and at the other end to a fixed lead-out connector leading out from said conduit,
    (iii) a third section having two disconnectable connectors at the ends thereof for respective connection to said fixed lead-out connector and to a second fixed connector carried by a plate remote from the reactor vessel in said building,
  (d) means for supporting said second cables between the first fixed connectors and the second fixed connectors, and
  (e) wherein each one of said first fixed connectors is associated with one of said lead-in connectors which opens into an adjacent one of said conduits, so that all the first sections each connecting one of the lead-in connectors to one of the first fixed connectors, and corresponding to similar devices, are of the same length, while the first sections corresponding to different devices are of different lengths.

2. An installation as claimed in claim 1, wherein a plurality of said devices are for redundancy of a given measurement, and the first fixed connectors relative to said redundant devices are associated with lead-in connectors carried by separate conduits.

3. An installation as claimed in claim 1, wherein all those third sections extending in the same direction from mutually parallel conduits are supported by the same bridge up to the same plate at a distance from the reactor.

4. An installation as claimed in claim 1, wherein the lead-in connectors associated with one of the conduits are disposed on lateral surfaces of the conduit and the lead-out connectors are at one of the ends of the conduit.

5. An installation as claimed in claim 4, wherein each of said conduits is divided longitudinally into two separate compartments each comprising one of the lateral surfaces and one of the ends of the conduit.

* * * * *